United States Patent Office 3,337,542
Patented Aug. 22, 1967

3,337,542
2 - ALKYL - 2 - [(OPTIONALLY - SUBSTITUTED) AMINO - 1 - NAPHTHYLIDEN]ETHYLCYCLO-PENTANE - 1,3 - DIONES, 3 - (OPTIONALLY-SUBSTITUTED)AMINO - 14 - HYDROXYESTRA-TETRAEN - 17 - ONES CORRESPONDING AND DERIVATIVES THEREOF
Raphael Pappo, Skokie, Ill., assignor to G. D. Searle & Co., Chicago, Ill., a corporation of Delaware
No Drawing. Filed Oct. 22, 1965, Ser. No. 502,373
7 Claims. (Cl. 260—240)

This application is a continuation-in-part of my copending applications Ser. No. 401,223, filed Oct. 2, 1964 and now abandoned, and Ser. No. 494,930, filed Oct. 11, 1965.

The present invention relates to a novel process for the manufacture of 19-norsteroids and to novel intermediates utilized in that process.

A starting material suitable for utilization in the instant process is 6-amino-1-tetralone, which is described by Allinger and Jones, J. Org. Chem. 27, 70 (1962). In the initial step of the instant process, that starting material is contacted with a vinyl organometallic reagent, preferably in a suitable organic solvent medium such as diethyl ether, dibutyl ether, tetrahydrofuran, etc., to afford 6-amino-1-vinyl - 1 - tetralol. Alternatively, 6-amino-1-tetralone or 6-amino-1-vinyl-1-tetralol is converted to an intermediate wherein the amino group has been alkylated or acylated. The particular intermediates envisaged are illustrated by the 1-vinyl-1-tetralols of the following structural formula

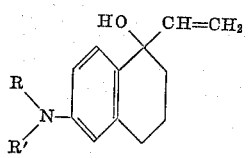

wherein R and R' are selected from the group consisting of hydrogen, hydrocarbon, (hydroxy-substituted)hydrocarbon, (amino-substituted)hydrocarbon, acyl and hydrocarbon-sulfonyl radicals and R and R' together can comprise the residue of a cycloaliphatic amine.

The hydrocarbon radicals indicated in the foregoing structural representation may be lower alkyl radicals such as methyl, ethyl, propyl, butyl, pentyl, hexyl, heptyl and the branched-chain groups isomeric therewith, aryl radicals such as phenyl, tolyl, and xylyl, or aralkyl radicals such as benzyl and phenethyl. Representative of the acyl radicals depicted therein are lower alkanoyl groups such as acetyl, propionyl, butyryl, valeryl, caproyl, heptanoyl and the branched-chain radicals isomeric therewith and aroyl groups such as benzoyl, toluoyl, and xyloyl. The hydrocarbon-sulfonyl radicals are exemplified by p-toluenesulfonyl, benzenesulfonyl and methanesulfonyl. Examples of the cycloaliphatic amines whose residues R and R' can represent are pyrrolidine, piperidine, morpholine, pipecoline, piperazine and hexamethylenimine. Their preparation is described in my copending application Ser. No. 494,930, filed Oct. 11, 1965.

When the above described 1-vinyl-1-tetralols are alkylated with a 2-alkylcyclopentane-1,3-dione in the presence of a suitable alkaline catalyst such as potassium hydroxide, sodium hydroxide or triethylamine, there is produced, depending upon the length of reaction, a tricyclic dione of the structural formula

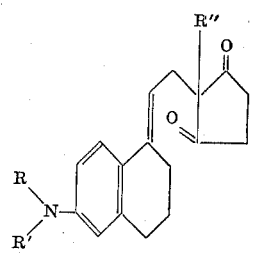

or a tetracyclic 14-hydroxy-17-one of the structural formula

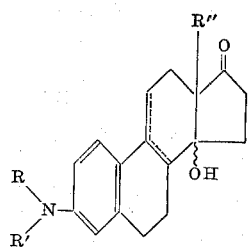

wherein R and R' are as hereinbefore defined, R" is a lower alkyl radical as hereinbefore exemplified, the dotted lines are indicative of a double bond linking carbon 9 to an adjacent C-ring carbon atom and the wavy line denotes the alternative α or β configuration at carbon 14. As a specific example, 6-pyrrolidino-1-vinyl-1-tetralol is contacted with 2-methylcyclopentane-1,3-dione in toluene in the presence of triethylamine to afford 2-methyl-2-(6-pyrrolidino-1-naphthyliden)ethylcyclopentane - 1,3-dione. When the reaction time is extended, however, further reaction occurs to yield the above illustrated 14-hydroxy intermediates. In that manner, 6-dimethylamino-1-vinyl-1-tetralol is converted to a mixture of 14-hydroxy-3-dimethylaminoestra-1,3,5(10)-9(11)-tetraen-17-one and 14-hydroxy-3-dimethylaminoestra - 1,3,5(10),8(9) - tetraen-17-one.

The above described tricyclic and 14-hydroxy tetracyclic intermediates, upon reaction with a suitable reducing reagent such as lithium aluminum hydride or lithium tri-(tertiary-butoxy) aluminum hydride afford the corresponding hydroxy substances. 2-methyl - 2 - (6-dimethylamino-1-naphthyliden)ethylcyclopentane - 1,3-dione, for example, is thus contacted with lithium tri-(tertiary-butoxy) aluminum hydride in pyridine to yield 1-hydroxy-2-methyl - 2 - (6-dimethylamino - 1 - naphthyliden)ethylcyclopentan-3-one. Ketalization of those intermediates, on the other hand, is effected by reaction with the appropriate monohydric or dihydric alcohol, preferably in the presence of a suitable acid catalyst. Thus, 2-methyl-2-(6-dimethylamino - 1 - naphthyliden)ethylcyclopentane-1,3-dione is converted to the corresponding 1-ethylene ketal by reaction with ethylene glycol in the presence of a catalytic quantity of p-toluenesulfonic acid.

When the aforementioned tricyclic or 14-hydroxy tetracyclic intermediates are dehydrated, the corresponding tetracyclic pentaenes of the following structural formula

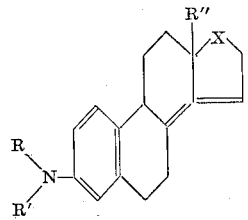

are produced. In that structural representation, the terms R, R' and R" are as hereinbefore defined, and X can be a carbonyl, hydroxymethylene or ketalized carbonyl group. In the instances where X represents a carbonyl group, these intermediates may be reduced by the method described hereinbefore to afford the corresponding 17-hydroxy compounds or may be contacted with a mono- or dihydric alcohol by the procedure described hereinbefore to afford the corresponding 17-ketals. This dehydration process is preferably conducted in an organic solvent medium in the presence of a strong acid catalyst. Thus, 2 - methyl - 2-(6-pyrrolidino-1-naphthyliden)ethylcyclopentane-1,3-dione is heated in benzene with p-toluenesulfonic acid to yield 3-pyrrolidinoestra-1,3,5(10),8(9),14-pentaen-17-one.

The aforementioned 1,3,5(10),8(9),14-pentaenes can be selectively hydrogenated to afford the corresponding 1,3,5(10),8(9)-tetraenes of the following structural formula

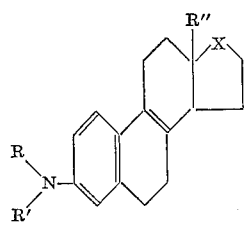

wherein R, R', R" and X are as hereinbefore defined. The aforementioned 3 - pyrrolidinoestra - 1,3,5(10),8(9),14-pentaen-17-one, for example, in a solution of benzene and pyridine, is shaken in a hydrogen atmosphere in the presence of 5% palladium-on-calcium carbonate catalyst, thus producing 3 - pyrrolidinoestra-1,3,5(10),8(9)-tetraen-17-one. The tetraen-17-ones encompassed by the latter structural formula are similarly converted to the corresponding 17-hydroxy and 17-ketal derivatives by methods analogous to those described hereinbefore. The tetraenes of the latter structural formula are useful also as anti-fungal and anti-protozoal agents in view of their ability to inhibit the growth of such organisms as *Trichophyton mentagrophytes* and *Tetrahymena gelleii*. In addition, they are inhibitors of dicotyledonous seed germination.

Reduction of the 8(9) double bond of the latter intermediates is conveniently effected by means of an alkali metal-liquid ammonia combination, optionally in the presence of aniline. Particularly suitable alkali metals are sodium, potassium and lithium. By that process, there are produced the 1,3,5(10)-trienes of the following structural formula

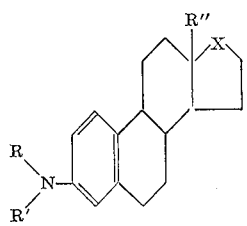

wherein R, R', R" and X are as hereinbefore defined. As a specific example, 3 - pyrrolidinoestra - 1,3,5(10),8(9)-tetraen-17β-ol in tetrahydrofuran containing aniline is allowed to react with sodium and liquid ammonia to produce 3-pyrrolidinoestra-1,3,5(10)-trien-17β-ol.

Reduction of either the instant 1,3,5(10),8(9)-tetraenes or the 1,3,5(10)-trienes with an alkali metal and liquid ammonia results in the 2,5(10)-dienes of the following structural formula

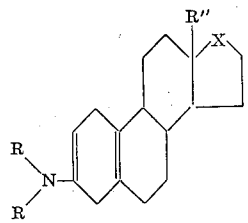

wherein R, R', R" and X are as hereinbefore defined. Thus, either 3-dimethylaminoestra-1,3,5(10)-trien-17β-ol or 3 - dimethylaminoestra-1,3,5(10),8(9)-tetraen-17β-ol, when contacted with lithium metal and liquid ammonia in tetrahydrofuran containing tertiary-butyl alcohol, affords 3-dimethylaminoestra-2,5(10)-dien-17β-ol.

Careful acid hydrolysis of the latter 2,5(10)-diene intermediates affords the corresponding 3-keto-$\Delta^{5(10)}$ compounds of the following structural formula

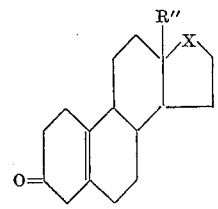

wherein R" and X are as hereinbefore defined. The latter substances are known intermediates to pharmacologically useful compounds. The hydrolysis of 3-dimethylaminoestra - 2,5(10) - dien-17-one thus results in estr-5(10)-ene-3,17-dione, which is useful in the manufacture of 17α-ethynyl-17β-hydroxyestr-5(10)-en-3-one, a known progestational agent. More vigorous acid hydrolysis of the aforementioned 2,5(10)-diene intermediates affords the known 3-keto-$\Delta^4$ compounds of the following structural formula

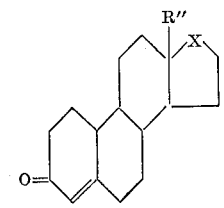

wherein R" and X are as hereinbefore defined. The latter substances are useful as intermediates in the manufacture of known pharmacologically useful steroids possessing the 3-keto-$\Delta^4$ structure. The compounds of the latter structural formula wherein X is a ketalized carbonyl function are particularly useful intermediates in view of the stability of the ketal function to alkaline reagents. Thus, 3 - dimethylaminoestra-2,5(10)-dien-17-one 17-diethyl ketal is contacted with aqueous sodium acetate in methanol to yield estr-4-ene-3,17-dione 17-diethyl ketal. Reduction of the 3-keto group is effected by reaction with lithium tri-(tertiary-butoxy) aluminum hydride in tetrahydrofuran, thus affording 3β-hydroxy-estr-4-en-17-one 17-diethyl ketal, and the 17-ketal function is removed by reaction with aqueous acetic acid to yield 3β-hydroxy-estr-4-en-17-one. Ethynylation of the latter substance followed by acetylation of the resulting 17α-ethynylestr-4-ene-3β,17β-diol affords the known pharmacologically useful 17α-ethynylestr-4-ene-3β,17β-diol 3,17-diacetate.

The products of the instant process described hereinbefore are obtained as *dl*-mixtures. The individual *d* and *l* enantiomorphs are obtained, however, by resolution techniques involving salt formation between the 3-amino moiety and an optically active acid. Suitable acids for this purpose are exemplified by d-camphorsulfonic, d-α-bromocamphorsulfonic, l-malic, l-mandelic, l-methoxyacetic, d and l-tartaric, d and l-diacetyltartaric and d and l dibenzoyltartaric acid. Thus, dl - 3-dimethylaminoestra-1,3,5(10),8(9),14-pentaen-17β-ol is contacted with d-dibenzoyltartaric acid to afford the amine salt, which is decomposed with aqueous sodium hydroxide in methanol to yield levorotatory 3-dimethylaminoestra-1,3,5(10),8(9),14-pentaen-17β-ol. An alternative procedure for obtaining the instant optically active compounds involves the use of an optically active reagent to effect an asymmetric synthesis. As a specific example, 2-methyl-2-(6-dimethylamino - 1 - naphthyliden)ethylcyclopentane - 1,3-dione is heated in benzene with d-camphorsulfonic acid to afford levorotatory 3-dimethylaminoestra-1,3,5(10),8(9),14-pentaen-17-one.

The invention will appear more fully from the examples which follow: These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

To a solution of 9.07 parts of 6-pyrrolidino-1-vinyl-1-tetralol in 32.2 parts of toluene are added successively 6.4 parts of triethylamine, 23 parts of 2-methylcyclopentane-1,3-dione and 95.7 parts of toluene. The resulting reaction mixture is heated with stirring, under nitrogen, for about 10 minutes, during which time approximately 30 parts by volume of solvent is distilled. The reaction mixture is then cooled, washed successively with dilute aqueous sodium hydroxide and water, dried over anhydrous sodium sulfate and concentrated to dryness under reduced pressure to afford 2-methyl-2-(6-pyrrolidino-1-naphthyliden)ethylcyclopentane-1,3-dione, represented by the following structural formula

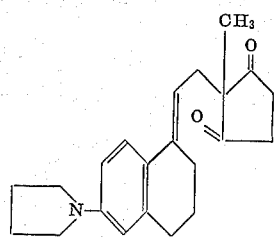

EXAMPLE 2

When an equivalent quantity of 6-morpholino-1-vinyl-1-tetralol is substituted in the procedure of Example 1, there is obtained 2-methyl-2-(6-morpholino-1-naphthyliden)ethylcyclopentane-1,3-dione.

EXAMPLE 3

A mixture of 55 parts of 6-dimethylamino-1-vinyl-1-tetralol, 62.9 parts of triethylamine, 31.2 parts of 2-methylcyclopentane-1,3-dione and 996 parts of toluene is heated vigorously at the reflux temperature, under nitrogen, for about 10 minutes, during which time the water of reaction is continuously removed. The reaction mixture is rapidly cooled, then is diluted with benzene and washed successively with cold dilute aqueous sodium hydroxide and water. Drying of that solution over anhydrous sodium sulfate followed by evaporation of the solvent by distillation under reduced pressure affords a residual fluid brownish oil, which is dissolved in 210 parts of ether containing approximately one part of triethylamine. That solution is stirred first at room temperature, then at 0–5° until crystallization is complete. The crystalline product is isolated by filtration, and dried in air, thus affording 2 - methyl-2-(6-dimethylamino-1-naphthyliden)-ethylcyclopentane-1,3-dione, melting at about 109–111°, and represented by the following structural formula

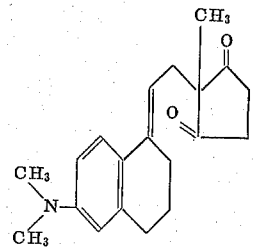

EXAMPLE 4

The substitution of an equivalent quantity of 6-diethylamino-1-vinyl-1-tetralol in the procedure of Example 3 affords 2-methyl-2-(6-diethylamino-1-naphthyliden)-ethylcyclopentane-1,3-dione.

EXAMPLE 5

A mixture containing 10.1 parts of 6-acetamido-1-vinyl-1-tetralol, 254 parts of toluene, 8 parts of 2-methylcyclopentane-1,3-dione and 16 parts of triethylamine is heated with stirring at the reflux temperature, under nitrogen, for about 4 hours, during which time the water of reaction is removed. The resulting mixture is then cooled to 0–5°, is diluted with benzene and washed successively with cold dilute aqueous sodium hydroxide and water. The washed solution is dried over anhydrous sodium sulfate, then concentrated to dryness under reduced pressure and near room temperature. The resulting 2-methyl - 2 - (6-acetamido-1-naphthyliden)ethylcyclopentane-1,3-dione displays an ultraviolet absorption maximum at about 279 millimicrons with a molecular extinction coefficient of approximately 21,800. It is represented by the following structural formula

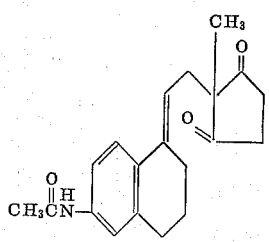

EXAMPLE 6

When an equivalent quantity of 6-propionamido-1-vinyl-1-tetralol is substituted in the procedure of Example 5, there is obtained 2-methyl-2-(6-propionamido-1-naphthyliden)ethylcyclopentane-1,3-dione.

EXAMPLE 7

The substitution of an equivalent quantity of 6-p-toluenesulfonylamido-1-vinyl-1-tetralol in the processes described in Example 6 results in 2-methyl-2-(6-p-toluenesulfonylamido - 1 - naphthyliden)ethylcyclopentane-1,3-dione.

EXAMPLE 8

By substituting an equivalent quantity of 6-methanesulfonylamido-1-vinyl-1-tetralol and otherwise proceeding according to the processes described in Example 5, there is obtained 2-methyl-2-(6 - methanesulfonylamido - 1 - naphthyliden)ethylcyclopentane-1,3-dione.

EXAMPLE 9

When an equivalent quantity of 2-ethylcyclopentane-1,3-dione is substituted in the procedure of Example 3, there is obtained 2-ethyl-2-(6-dimethylamino-1-naphthyliden)-ethylcyclopentane-1,3-dione.

EXAMPLE 10

To a solution of 1.4 parts of 6-dimethylamino-1-vinyl-1-tetralol in 13 parts of toluene is added successively 0.52 part of 2-methylcyclopentane-1,3-dione and 0.52 part of triethylamine. The resulting reaction mixture is heated at the reflux temperature with stirring for about 45 minutes, in a nitrogen atmosphere, then is partially concentrated by distillation over a period of about 3 hours. Cooling of the residual mixture followed by filtration affords a filtrate, which is washed successively with cold aqueous 5% sodium hydroxide and water, then dried over anhydrous sodium sulfate and evaporated to a small volume under reduced pressure. Dilution of the resulting mixture with ether results in formation of crystals, melting at about 163–165°, and consisting of a mixture, approximately one-third of which is 14-hydroxy-3-dimethylaminoestra-1,3,5(10),9(11)-tetraen-17-one and approximately two-thirds of which is 14-hydroxy-3-dimethylaminoestra-1,3,5(10),8(9)-tetraen - 17 - one. This material exhibits an ultraviolet absorption maximum at about 295 millimicrons with a molecular extinction coefficient of about 19,600.

EXAMPLE 11

To a solution of 4.27 parts of *d*-camphorsulfonic acid in 112 parts of ethylene glycol is added a solution of 5.03 parts of 2 - methyl - 2 - (6-dimethylamino-1-naphthyliden)ethylcyclopentane-1,3-dione in 52.7 parts of benzene, and the resulting mixture is allowed to stand at room temperature, under nitrogen, for about 2½ hours. At the end of that time, the mixture is cooled to 0–5°, then is stirred for about 10 minutes with a cold solution of 21.3 parts of sodium hydroxide in 100 parts of water. Extraction with benzene followed by washing of the organic layer with water and drying over anhydrous sodium sulfate affords a solution which is evaporated to dryness to yield, as an oil, 2-methyl-2-(6-dimethylamino - 1 - naphthyliden)ethylcyclopentane - 1,3-dione 1-ethylene ketal, which is represented by the following structural formula

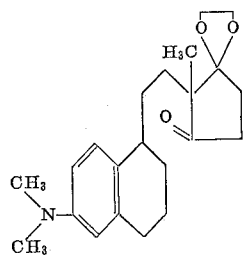

EXAMPLE 12

To a solution of 0.86 part of *d*-camphorsulfonic acid in 392 parts of ethylene glycol, under nitrogen, is added a solution of one part of 14-hydroxy-3-dimethylaminoestra-1,3,5(10),8(9)-tetraen-17-one in 44 parts of benzene. The reaction mixture is heated under reflux for about 1½ hours, during which time the water of reaction is continuously removed, then is cooled to 0–5° and stirred about 10 minutes with a cold solution of 2 parts of sodium hydroxide in 20 parts of water. Extraction of the resulting aqueous mixture with benzene affords an organic layer, which is washed with water, dried over anhydrous sodium sulfate and evaporated to dryness under reduced pressure to produce 14-hydroxy-3-dimethylaminoestra-1,3,5(10),8(9)-tetraen-17-one 17-ethylene ketal.

EXAMPLE 13

To a solution of 10 parts of 2-methyl-2-(6-dimethylamino-1-naphthyliden)ethylcyclopentane-1,3-dione in 100 parts of pyridine is added, at 0–5°, 9.8 parts of lithium tri-(tertiary-butoxy) aluminum hydride and that reaction mixture is kept at that temperature for approximately 3 hours. Stirring of the mixture with excess 10% aqueous sodium hydroxide at room temperature for about 30 minutes followed by dilution with excess saturated aqueous sodium potassium tartrate affords an aqueous mixture, which is extracted with benzene. The benzene layer is separated, washed with water, dried over anhydrous sodium sulfate and concentrated to dryness under reduced pressure. Recrystallization of the resulting solid residue first from ether then from methanol affords 1-hydroxy-2-methyl-2-(6-dimethylamino - 1 - naphthyliden)ethylcyclopentan-3-one, melting at about 115–117°.

EXAMPLE 14

A mixture of 1.5 parts of 1-hydroxy-2-methyl-2-(6-dimethylamino-1-naphthyliden)ethylcyclopentan-3-one, 15 parts of pyridine and 7.5 parts of acetic anhydride is allowed to stand at room temperature for about 15 hours, then is poured carefully into a mixture of ice and water. After standing at room temperature for about 2 hours, the aqueous mixture is extracted with benzene, and the benzene layer is separated, washed successively with ice cold aqueous sodium hydroxide and water, then dried over anhydrous sodium sulfate and evaporated to dryness under reduced pressure to yield 1-acetoxy-2-methyl-2-(6-dimethylamino-1-naphthyliden)ethylcyclopentan-3-one.

EXAMPLE 15

The substitution of an equivalent quantity of ethyl alcohol in the procedure of Example 11 results in 2-methyl-2-(6-dimethylamino - 1 - naphthyliden)ethylcyclopentane-1,3-dione 1-diethyl ketal.

EXAMPLE 16

When an equivalent quantity of propionic anhydride is substituted in the procedure of Example 14, there is obtained 2 - methyl-1-propionoxy-2-(6-dimethylamino-1-naphthyliden)ethylcyclopentan-3-one.

EXAMPLE 17

By substituting an equivalent quantity of methyl alcohol and otherwise proceeding according to the processes described in Example 11, there is obtained 2-methyl-2-(6-dimethylamino - 1 - naphthyliden)ethylcyclopentane-1,3-dione 1-dimethyl ketal.

What is claimed is:

1. A process for the manufacture of a member selected from the group consisting of compounds of the formulas

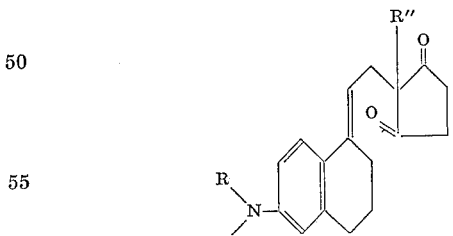

and

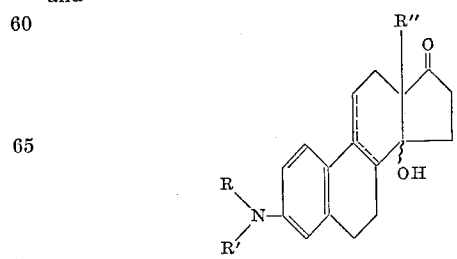

wherein R is selected from the group consisting of lower alkyl, lower alkanoyl and hydrocarbon-sulfonyl radicals, R' is hydrogen when R is selected from the group consisting of lower alkanoyl and hydrocarbon-sulfonyl radicals, and R' is a lower alkyl radical when R is a lower alkyl radical, R and R' together comprise the residue of a secondary cycloaliphatic amine, and R" is a lower alkyl radical, which comprises contacting a compound of the formula

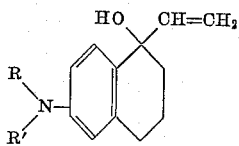

wherein R and R' are as hereinbefore defined, with a compound of the formula

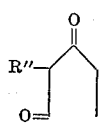

wherein R" is as hereinbefore defined.

2. A member selected from the group consisting of compounds of the formulas

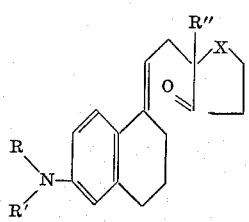

and

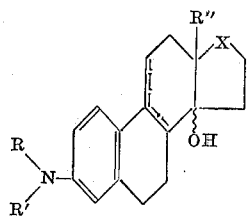

wherein R is selected from the group consisting of lower alkyl, lower alkanoyl and hydrocarbon-sulfonyl radicals, R' is hydrogen when R is selected from the group consisting of lower alkanoyl and hydrocarbon-sulfonyl radicals and R' is lower alkyl when R is a lower alkyl radical, R and R' together comprise the residue of a secondary cycloaliphatic amine, R" is a lower alkyl radical and X is selected from the group consisting of carbonyl, hydroxymethylene, (lower alkanoyl)oxymethylene, alkylenedioxy-methylene and bis-(lower alkoxy)methylene radicals.

3. 2-methyl-2-(6-pyrrolidino-1-naphthyliden) - ethylcyclopentane-1,3-dione.

4. 2-methyl-2-(6-dimethylamino - 1 - naphthyliden)-ethylcyclopentane-1,3-dione.

5. 2-methyl-2-(6-acetamido - 1 - naphthyliden)-ethylcyclopentane-1,3-dione.

6. 14-hydroxy-3-dimethylaminoestra-1,3,5(10) - 8(9)-tetraen-17-one.

7. 14-hydroxy - 3 - dimethylaminoestra-1,3,5(10)-9(11)-tetraen-17-one.

References Cited

Ananchenko et al.: Tetrahedron Letters, 23, pp. 1553–58 (1963).

LEWIS GOTTS, *Primary Examiner.*

THOMAS M. MESHBESHER, *Assistant Examiner.*